United States Patent [19]
Ng

[11] Patent Number: 6,070,722
[45] Date of Patent: Jun. 6, 2000

[54] COMPACT DISC PROTECTIVE CARTRIDGE STRUCTURE

[76] Inventor: Chan-Pao Ng, 1F, No. 149, sec. 3, Jong-Shing Rd., Shin-Diann City, Taipei Hsien, Taiwan

[21] Appl. No.: 09/314,884

[22] Filed: May 19, 1999

[51] Int. Cl.[7] .................................................. B65D 85/57
[52] U.S. Cl. ........................................ 206/308.1; 312/9.48
[58] Field of Search ................................ 206/303, 308.1, 206/309, 312; 312/9.48

[56] References Cited

U.S. PATENT DOCUMENTS

| | | | |
|---|---|---|---|
| 3,730,602 | 5/1973 | Campbell et al. | 206/309 |
| 4,875,578 | 10/1989 | Nehl | 206/308.1 |
| 5,000,316 | 3/1991 | Lerner | 206/308.1 |
| 5,495,939 | 3/1996 | Castritis | 206/308.1 |
| 5,590,768 | 1/1997 | Hilton et al. | 206/308.1 |
| 5,593,031 | 1/1997 | Uchida | 206/308.1 |
| 5,730,283 | 3/1998 | Lax | 206/308.1 |
| 5,881,872 | 3/1999 | Frick | 206/308.1 |
| 5,954,197 | 9/1999 | Ditzig et al. | 206/308.1 |

Primary Examiner—Jim Foster
Attorney, Agent, or Firm—Dougherty & Troxell

[57] ABSTRACT

A compact protective cartridge structure including a box body and a box cover pivotally with the box body. The box body is a flat rectangular box body a front side of which is formed with an opening. An upper face of the box body is formed with a slot within which a push block is slidable back and forth to drive a cartridge connected under the push block. The box cover is formed by two lateral walls and a front wall. The two lateral walls are formed with pivot shafts. A top face of the box cover is formed with an elongated window along the front wall. A compact disc can be received and clamped in the cartridge which is back and forth slidably received in the box body to facilitate placing, taking and carriage of the compact disc. The box cover achieves a dustproof effect and prevents the compact disc from dropping out.

8 Claims, 8 Drawing Sheets

COMPACT DISC PROTECTIVE CARTRIDGE STRUCTURE

BACKGROUND OF THE INVENTION

The present invention relates to a compact disc protective cartridge structure in which a compact disc is received and clamped in a cartridge which is back and forth slidably received in the box body.

Figure 1:
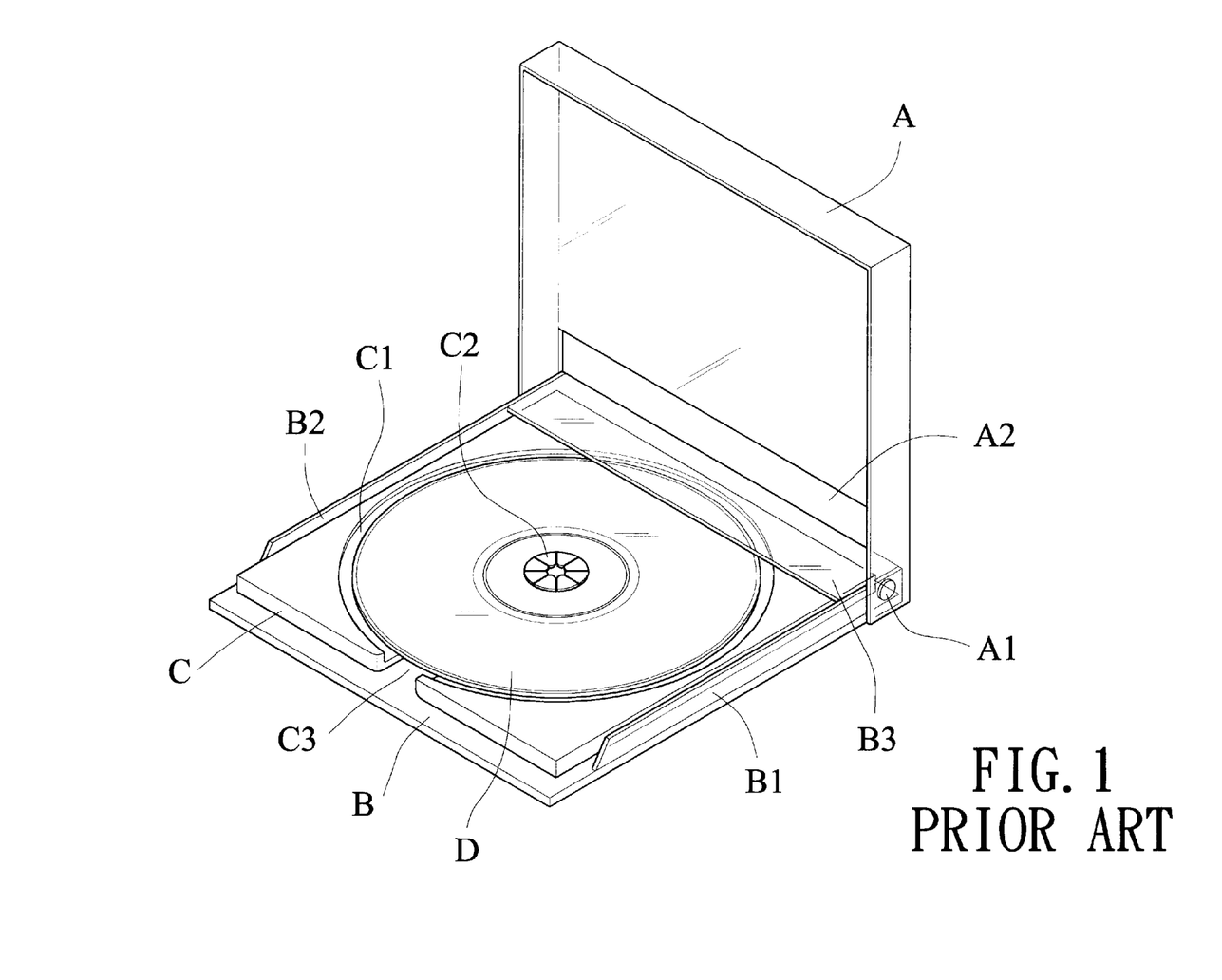
FIG. 1 is a perspective view of a conventional compact disc box.

Various types of video/audio media are commercially available, such as CD, DVD, etc. FIG. 1 shows a box body for receiving a compact disc. The box body is inherent from the box body for 3½" floppy disc, including an upper cover A and a lower cover B pivotally connected therewith. Two lateral walls of the upper cover A extend forward and together with a top face define a U-shaped slot A2. Each lateral wall is disposed with a pivot shaft A1 for pivotally connecting with the lower cover B. Two lateral sides of the lower cover B are disposed with upright short flanges B1, B2 interconnected by a transverse bar B3 at rear end so as to define a receptacle for placing threin a holder tray C. The holder tray C is recessed with a receiving space C1 in which a projecting engaging section C2. One side of the holder tray C is formed with a notch for facilitating placing and taking of a compact disc D.

According to the above arrangement, when taking the compact disc and after opening the upper cover A, the holder tray C is likely to drop out of the receptacle of the lower cover B to lead to damage of the compact disc.

SUMMARY OF THE INVENTION

In order to obviate the above shortcoming, it is a primary object of the present invention to provide a compact disc protective cartridge structure enables a user to easily place and take a compact disc.

It is further object of the present invention to provide the above compact disc protective cartridge structure which is able to prevent the compact disc from dropping out of the box body.

According to the above objects, the compact protective cartridge structure of the present invention includes a box body and a box cover pivotally with the box body. The box body is a flat rectangular box body a front side of which is formed with an opening. An upper face of the box body is formed with a slot within which a push block is slidable back and forth to drive a cartridge connected under the push block. The box cover is formed by two lateral walls and a front wall. The two lateral walls are formed with pivot shafts. A top face of the box cover is formed with an elongated window along the front wall. A compact disc can be received and clamped in the cartridge which is back and forth slidably received in the box body to facilitate placing, taking and carriage of the compact disc. The box cover achieves a dustproof effect and prevents the compact disc from dropping out.

The present invention can be best understood through the following description and accompanying drawings wherein:

DETAILED DESCRIPTION OF THE PREFERRED EMBODIMENT

Figure 2:
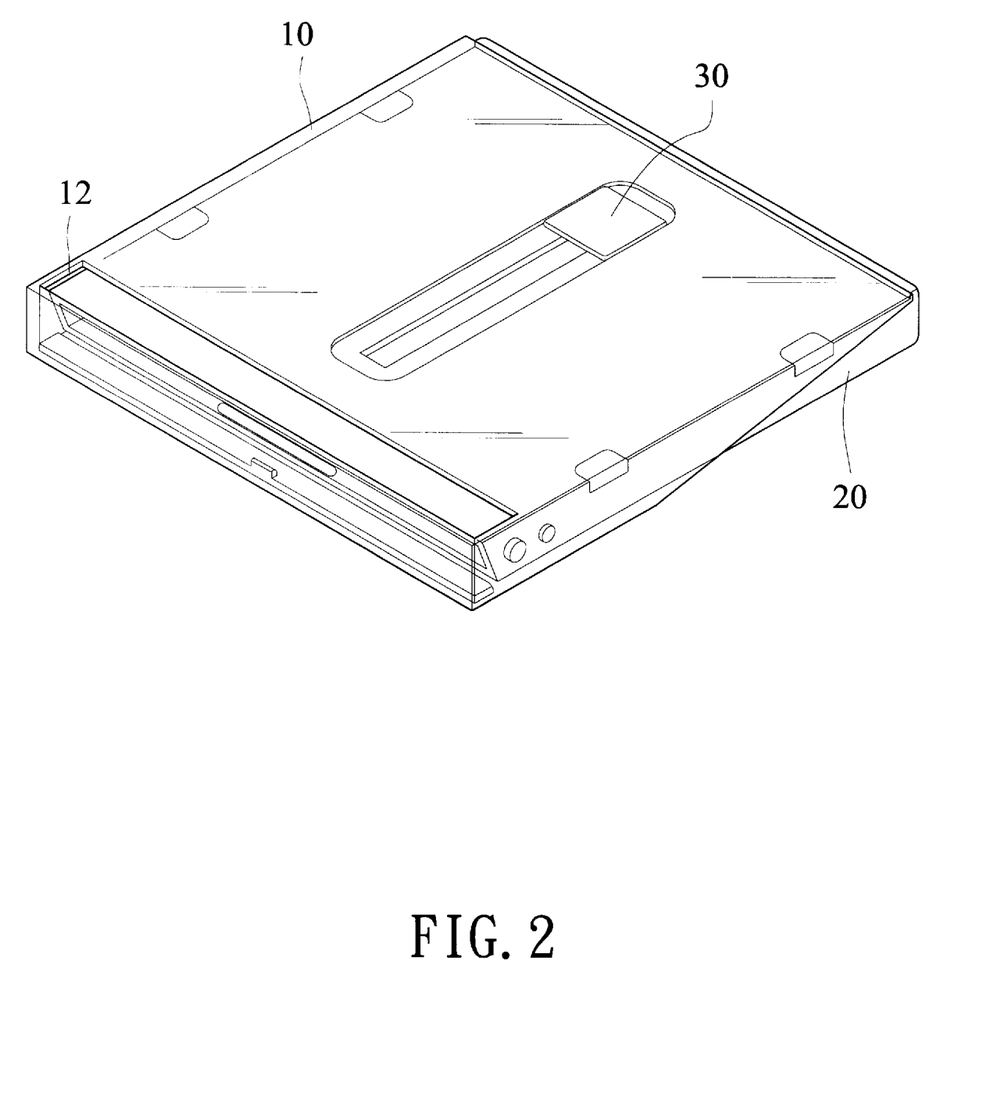
FIG. 2 is a perspective assembled view of the compact disc protective cartridge structure of the present invention.

Please refer to FIG. 2. The present invention includes a box body 20, a cartridge 40 fitted in the box body 20 and an outer box cover 10 pivotally connected with the box body 20.

Figure 3:
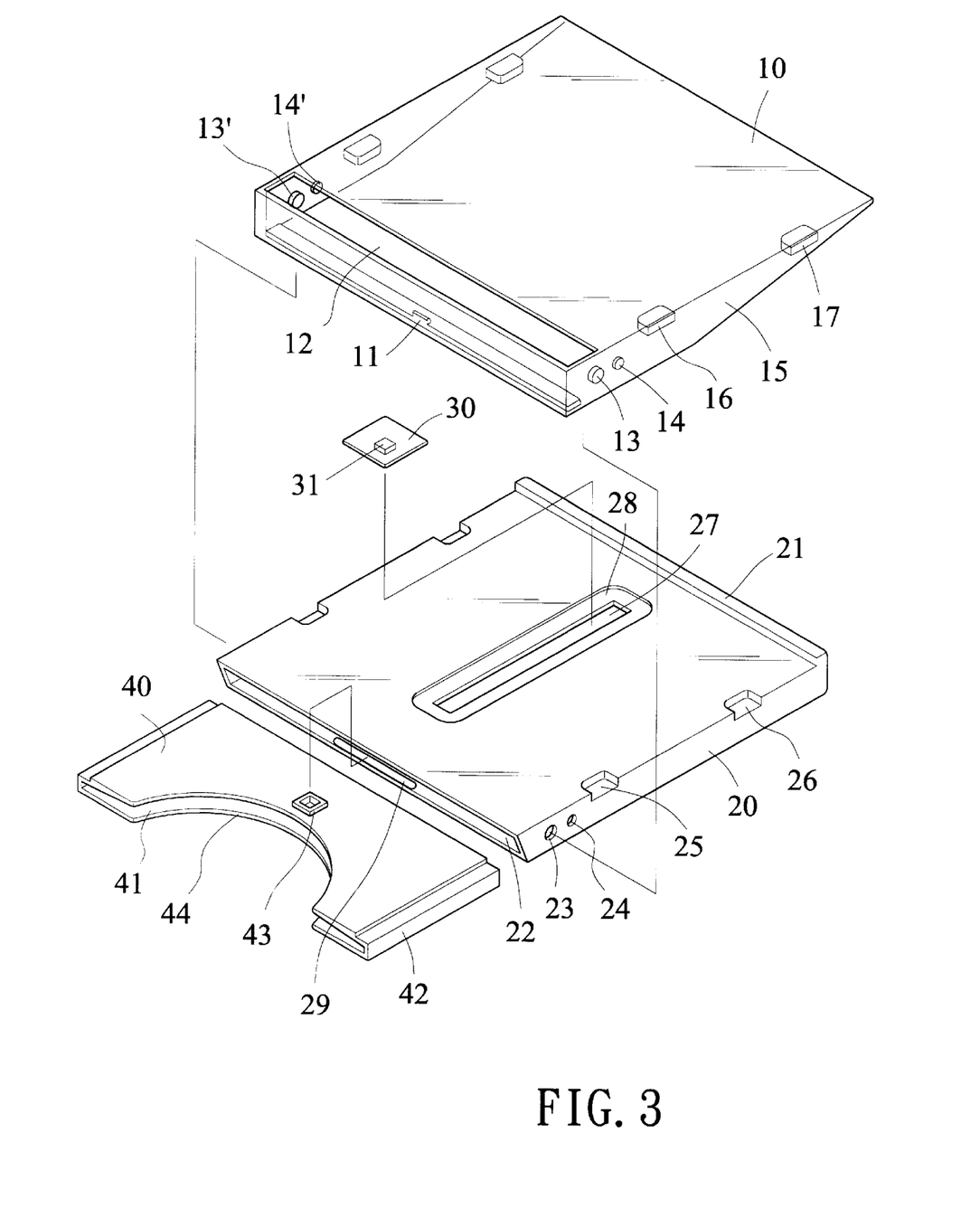
FIG. 3 is a perspective exploded view of the compact disc protective cartridge structure of the present invention.

Referring to FIG. 3, the box body 20 is a flat rectangular box body formed with an oblique opening 22 with a shorter lower edge. The upper and lower edges of the middle section of the oblique opening 22 are respectively disposed with sponge bodies 29, 29'. A rear end of the box body 20 is formed with an upward projecting flange 21. Two sides of the front end of the box body 20 are respectively formed with shaft holes 23, 23' and engaging holes 24, 24'. The adjoining sections between the lateral walls and top face of the box body 20 are formed with several insertion recesses 25, 25', 26, 26' on front and rear sides. The center of the top face of the box body 20 is formed with an elongated depression 28 in which a slot 27 is formed.

The box cover 10 is dimensioned in accordance with the box body 20 and formed by two lateral walls and a front wall. The lateral walls 15, 15' are upward inclinedly tapered from the middle section to the rear end of the box cover 10. The adjoining sections between the lateral walls and the top face are disposed with several insertion blocks 16, 16', 17, 17' on front and rear sides. Two sides of the front end of the box cover 10 are respectively formed with pivot shafts 13, 13' and engaging blocks 14, 14'. The bottom edge of the front wall is formed with a stepped face 11. The front end of the top face of the box cover 10 is formed with an elongated window 12.

The cartridge 40 has a size which is one half of the box body 20 and can be placed into the box body 20. The upper edges of two lateral sides of the cartridge 40 are disposed with recessed slide rails 42, 42'. The front side of the cartridge is formed with an arch opening 44 in which a cartridge cavity 41 is defined. The inner walls of the cartridge cavity 41 define a wedge space. The top face of the cartridge 40 is disposed with an upward insertion projection 43 in which a dent is formed.

Figure 4:
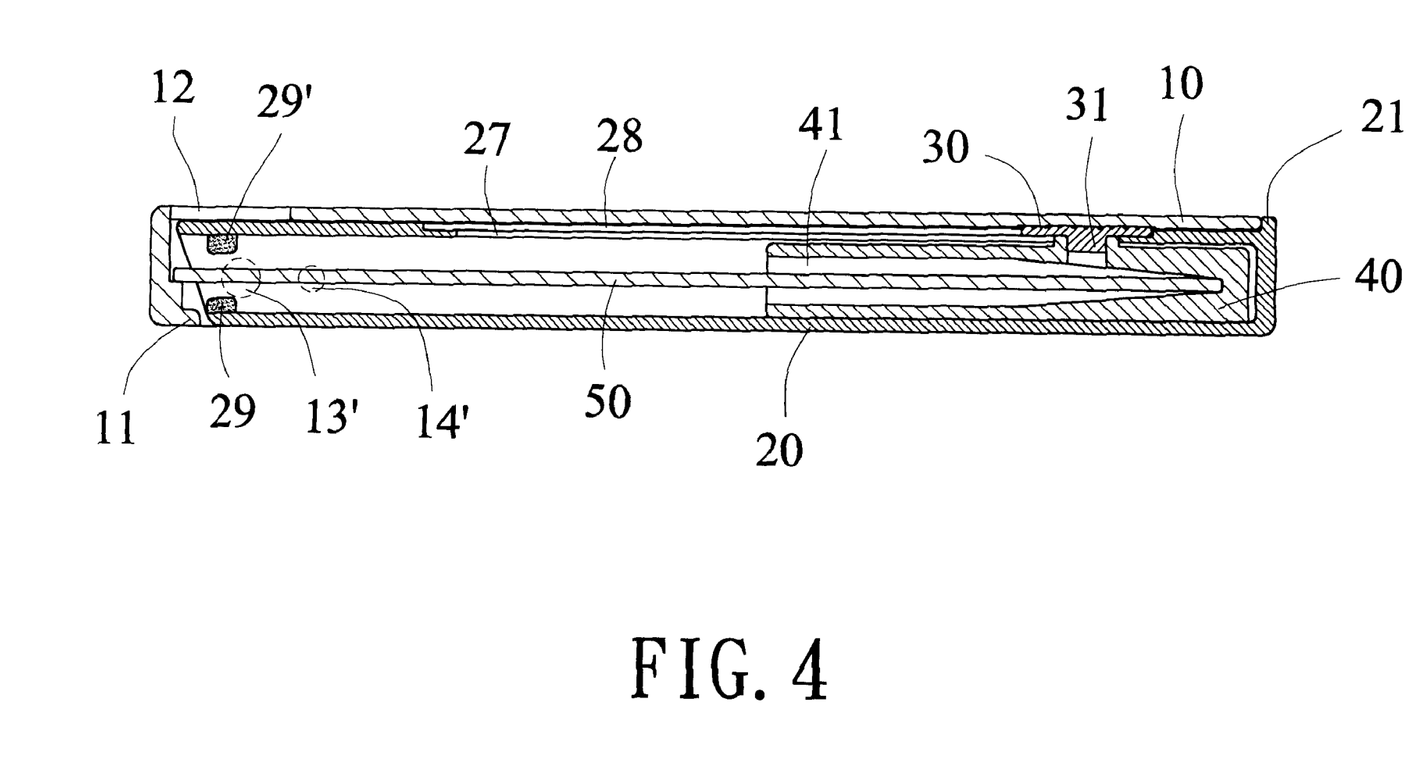
FIG. 4 is a sectional view of the compact disc protective cartridge structure of the present invention, in which a compact disc is received.

Referring to FIGS. 3 and 4, the cartridge 40 is placed into the opening 22 of the box body 20. The lateral slide rails 42, 42' of the cartridge 40 abut against the lateral insertion recesses 25, 25', 26, 26' of the box body 20 and the insertion projection 43 of the top face of the cartridge 40 is positioned in the slot 27 of the box body 20. A boss 31 on the bottom face of a push block 30 is inserted with the insertion projection 43 of the cartridge 40. The pivot shafts 13, 13' of the box cover 10 are pivotally connected in the pivot holes 23, 23' of the box body 20. When closing the box cover 10, the lateral engaging blocks 14, 14' and the insertion blocks 16, 16', 17, 17' are engaged in the engaging holes 24, 24' and insertion recesses 25, 25', 26, 26' of the box body 20 so as to prevent the box cover 10 from being freely opened. In addition, the stepped face 11 of the box cover 10 prevents dust from entering the oblique opening 22 of the box body 20.

Figure 7:
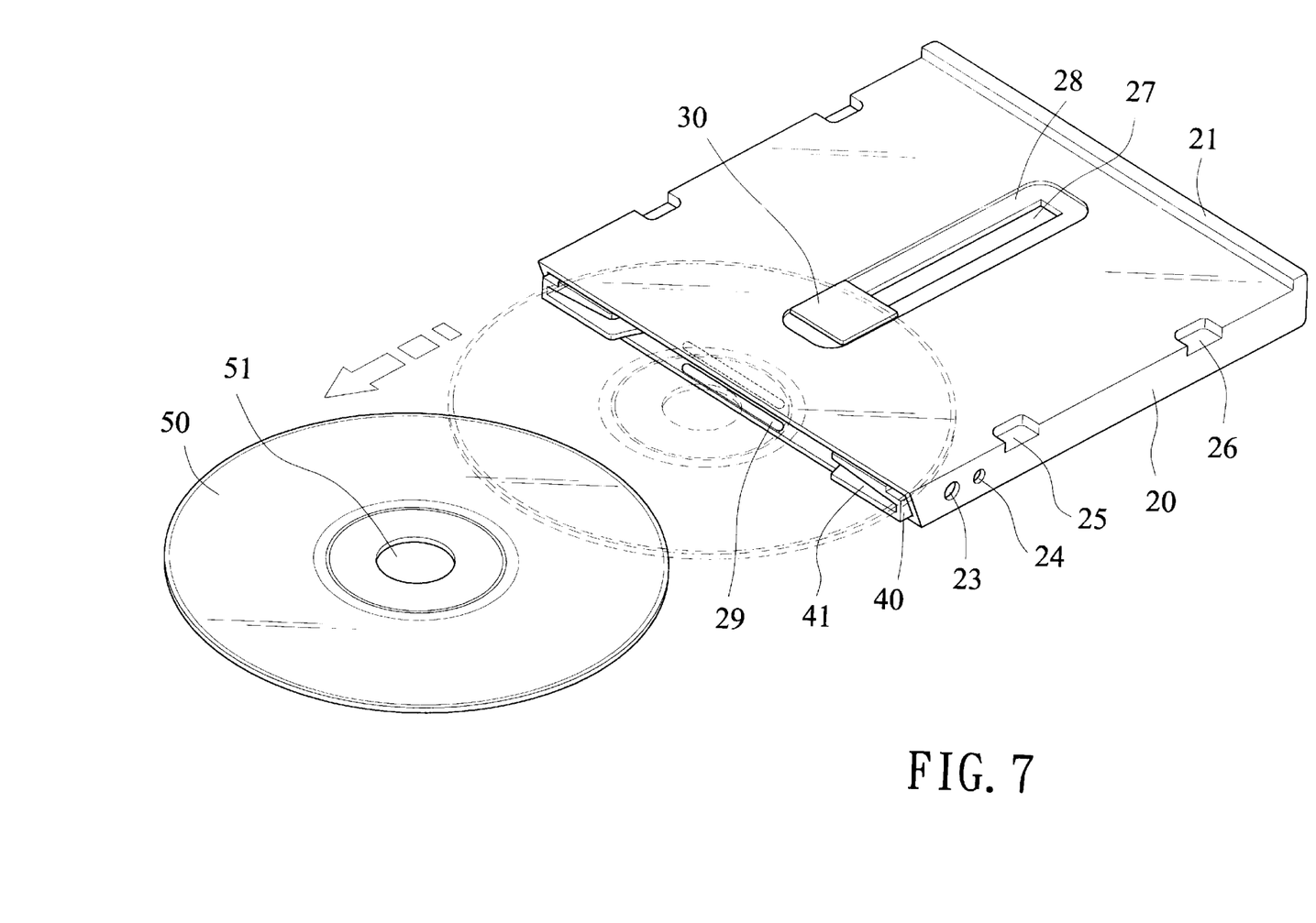
FIG. 7 is a perspective view showing that the compact disc is pushed outward from the box body for a user to take out.

As shown in FIG. 7, when placing a compact disc 50, the push block 30 on the box body 20 is moved forward, whereby the cartridge 40 connected under the push block 30 is moved forward along therewith. At this time, the opening 44 of the cartridge 40 is flush with the opening 22 of the box body 20 and the compact disc 50 can be inserted into the cartridge cavity 41 of the cartridge 40. The compact disc 50 is clamped in the wedge space at rear end of the cartridge cavity. Then the push block 30 is pushed backward. At this time, the sponge bodies 29, 29' on upper and lower edges of the opening 22 of the box body serve to protect the compact disc 50 from being scraped. Accordingly, the entire compact disc 50 can be received in the box body 20. Referring to FIG. 4, when closing the box cover 10, the front wall of the box cover 10 seals the opening 22 of the box body 20 to prevent the compact disc 50 from droping out. In addition, the other side of the compact disc 50 abuts against the stepped face 11 on the front wall of the box cover.

Figure 5:
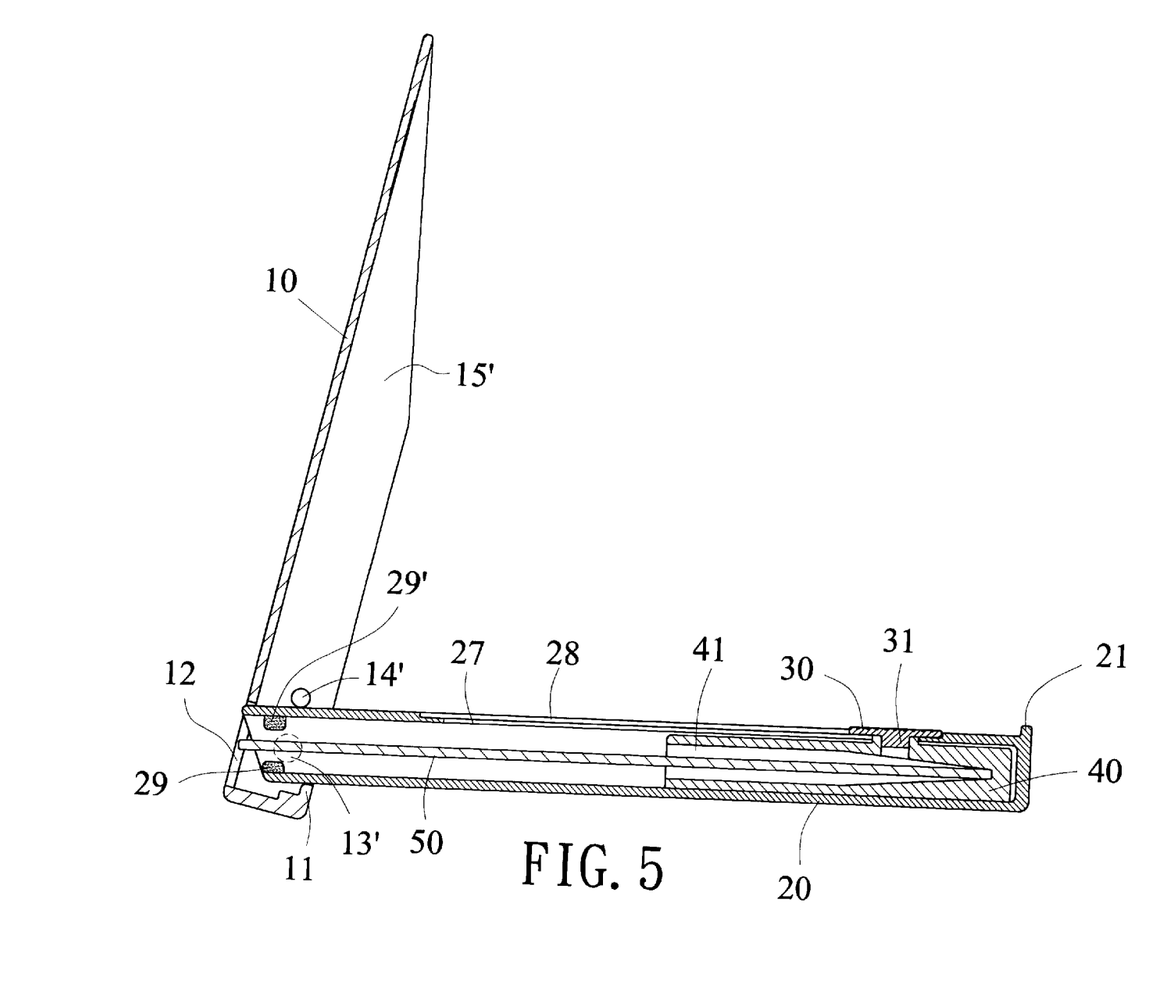
FIG. 5 is a sectional view of the compact disc protective cartridge structure of the present invention, in which the box cover is pivotally upward opened.
Figure 6:
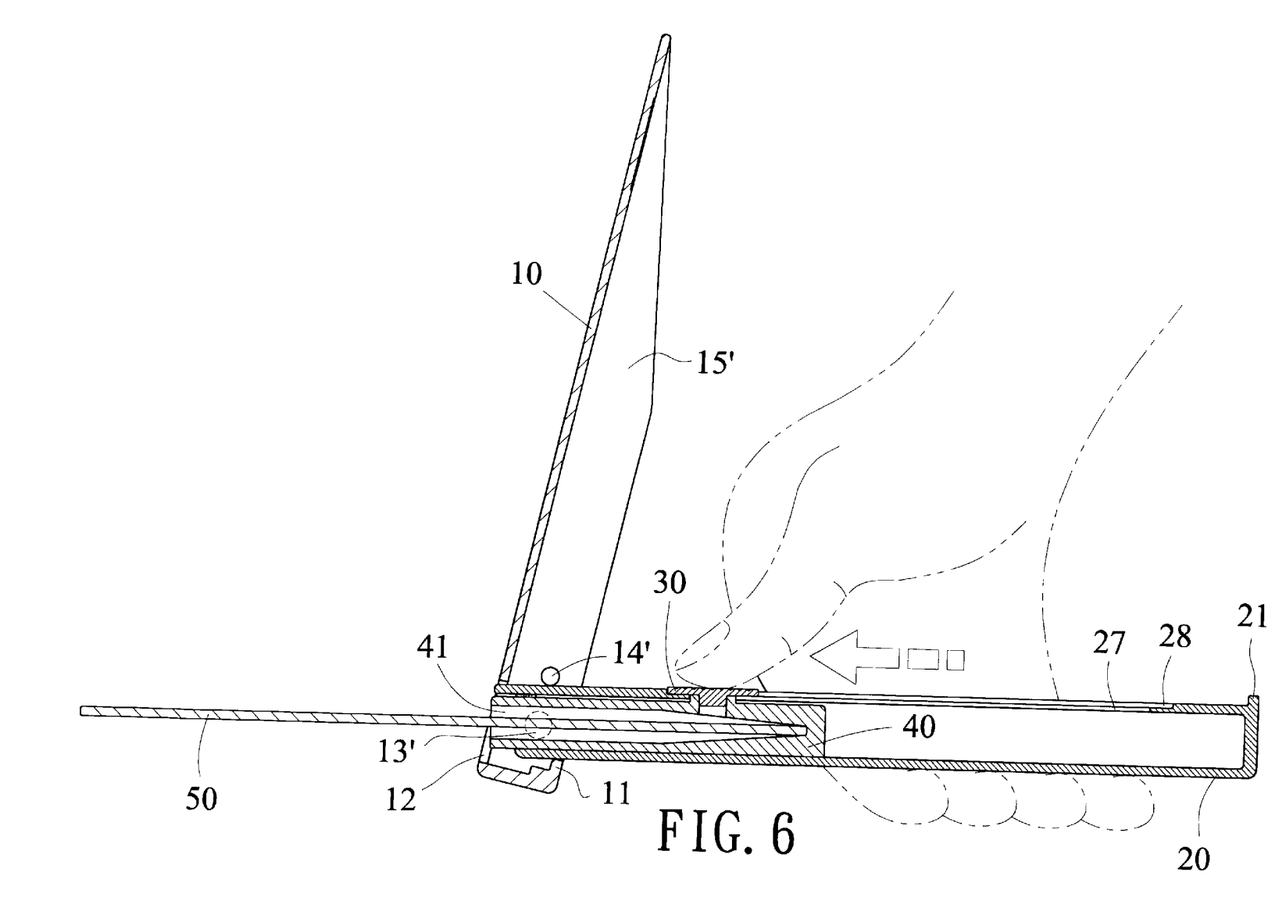
FIG. 6 is a sectional view according to FIG. 5, showing that the compact disc is taken out of the box body.
Figure 8:
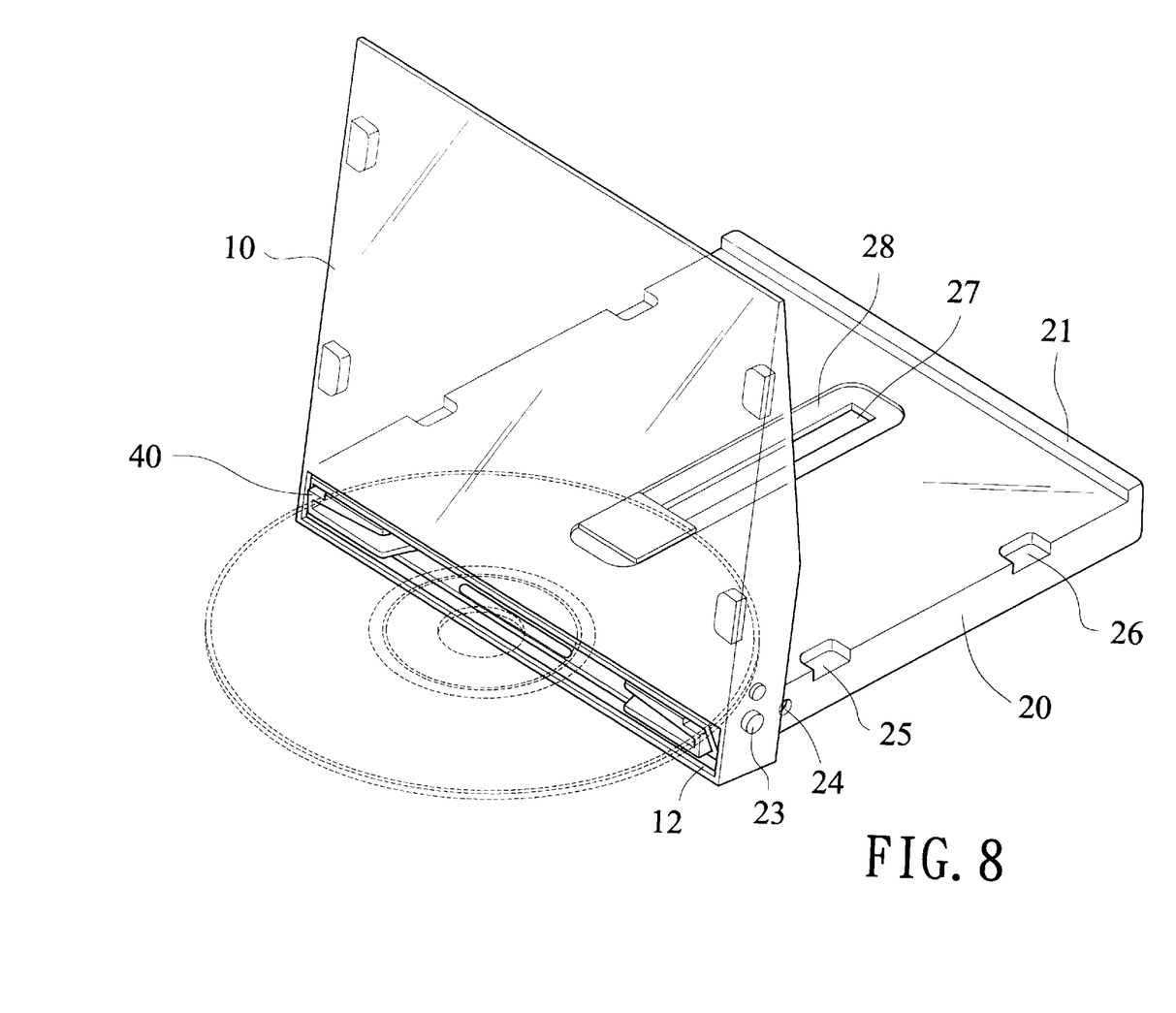
FIG. 8 is a perspective view according to FIG. 7, in which the box cover is opened.

Please refer to FIGS. 5, 6 and 8. When taking out the compact disc 50, the box cover 10 is opened with the engaging blocks 14, 14' thereof abut against the upper face of the box body 20. The bottom of the stepped face 11 abuts against the lower face of the box body 20. The window 12 is positioned at the opening 22 of the box body 20. At this time, the push block 30 is slided forward to drive the cartridge 40 thereunder and make the opening 44 of the cartridge 40 flush with the opening 22 of the box body 20. Therefore, the central through hole 51 of the compact disc 50 is pushed out of the box body for a user to easily take out the compact disc.

The above embodiment is only used to illustrate the present invention, not intended to limit the scope thereof Many modifications of the above embodiment can be made without departing from the spirit of the present invention.

What is claimed is:

1. A compact disc protective cartridge structure comprising a box body and a box cover pivotally with the box body, the box body being a flat rectangular box body front side of which is formed with an opening, an upper face of the box body being formed with a slot within which a push block is slidable back and forth to drive a cartridge connected under the push block, the box cover being formed by two lateral walls and a front wall, the two lateral walls being formed with pivot shafts, a top face of the box cover being formed with an elongated window along, the front wall.

2. A compact disc protective cartridge structure as claimed in claim 1, wherein the opening of the box body is formed with an oblique cut face having a longer upper edge and a shorter lower edge.

3. A compact disc protective cartridge structure as claimed in claim 2, wherein the upper and lower edges of the opening of the box body are disposed with sponge bodies.

4. A compact disc protective cartridge structure as claimed in claim 1, wherein two lateral sides of the box body are respectively disposed with shaft holes, engaging holes and several insertion recesses.

5. A compact disc protective cartridge structure as claimed in claim 1, wherein the lateral walls of the box cover are disposed with pivot shafts, engaging blocks and several insertion blocks corresponding to the box body.

6. A compact disc protective cartridge structure as claimed in claim 1, wherein an inner edge of the front wall of the box cover is formed with a stepped face.

7. A compact disc protective cartridge structure as claimed in claim 1, wherein two lateral sides of the cartridge are formed with slide rails corresponding to the insertion recesses of the box body.

8. A compact disc protective cartridge structure as claimed in claim 1, wherein the inner walls of the cartridge cavity of the cartridge define a wedge space.

\* \* \* \* \*